(12) United States Patent
Iwers (10) Patent No.: US 7,801,651 B2
(45) Date of Patent: Sep. 21, 2010

(54) METHOD FOR PLANNING THE JOURNEY OF A SUBMARINE

(75) Inventor: Uwe-Jens Iwers, Lübeck (DE)

(73) Assignee: Howaldtswerke-Deutsche Werft GmbH, Kiel (DE)

( * ) Notice: Subject to any disclaimer, the term of this patent is extended or adjusted under 35 U.S.C. 154(b) by 1465 days.

(21) Appl. No.: 11/133,559

(22) Filed: May 20, 2005

(65) Prior Publication Data

US 2005/0261844 A1  Nov. 24, 2005

(30) Foreign Application Priority Data

May 21, 2004  (DE)  .................. 10 2004 024 972

(51) Int. Cl.
*B60L 7/00* (2006.01)
(52) U.S. Cl. .................. 701/21; 320/112; 320/101; 320/137; 320/139; 320/160; 429/221; 429/223; 429/224; 429/231.2; 429/231.3; 318/139
(58) Field of Classification Search ................ 700/245; 701/21; 320/137, 139, 160, 39, 112, 138, 320/101; 429/221, 223, 224, 231.2, 231.3, 429/13, 22, 23; 318/139
See application file for complete search history.

(56) References Cited

U.S. PATENT DOCUMENTS

| | | | | |
|---|---|---|---|---|
| 3,703,675 A * | 11/1972 | Alric et al. | .................. | 320/159 |
| 3,786,343 A * | 1/1974 | Ehlers | ................ | 324/434 |
| 4,048,383 A * | 9/1977 | Clifford | .................. | 429/19 |
| 4,066,936 A * | 1/1978 | Hirota | ................ | 318/139 |
| 4,198,703 A * | 4/1980 | Huisveld et al. | ................ | 367/1 |
| 4,229,687 A * | 10/1980 | Newman | ................ | 320/112 |
| 4,231,171 A * | 11/1980 | Balligand et al. | ............. | 37/195 |
| 4,961,043 A * | 10/1990 | Koenck | ................ | 320/132 |
| 5,144,587 A * | 9/1992 | Mason | ................ | 367/1 |
| 5,790,976 A * | 8/1998 | Boll et al. | ................ | 455/456.5 |
| 5,973,478 A * | 10/1999 | Keating et al. | ................ | 320/125 |
| 5,998,968 A * | 12/1999 | Pittman et al. | ................ | 320/130 |
| 6,347,910 B1 * | 2/2002 | Morishige | ................ | 405/210 |
| 6,485,057 B1 * | 11/2002 | Midorikawa et al. | ........ | 280/807 |
| 6,729,650 B2 * | 5/2004 | Midorikawa et al. | ........ | 280/807 |
| 6,752,250 B2 * | 6/2004 | Tanner | ................ | 188/267 |
| 6,892,985 B2 * | 5/2005 | Jakubowski, Jr. | ........ | 244/137.4 |
| 6,997,474 B2 * | 2/2006 | Midorikawa et al. | ........ | 280/735 |
| 7,040,444 B2 * | 5/2006 | Midorikawa et al. | ........ | 180/286 |
| 7,084,585 B2 * | 8/2006 | Yamamoto et al. | ........ | 315/291 |

(Continued)

OTHER PUBLICATIONS

Wayne et al., Electrical Services for Data Centre and Telecommunication Gateway, 2000, Internet, pp. 1-9.*
Roberge et al., Testing and Evaluation of Tubular Positive Lead-Acid Batteries, 1995, p. 147-151.*
FAS, Air Anti-Submarine Warfare, 1999, Internet, pp. 1-7.*

*Primary Examiner*—Khoi Tran
*Assistant Examiner*—McDieunel Marc
(74) *Attorney, Agent, or Firm*—McGlew and Tuttle, P.C.

(57) ABSTRACT

A method and system for planning the journey of a submarine are provided using at least one electrical drive with a battery for energy supply and a charging device for the battery. For a selected future point in time, the remaining available energy reserve of the battery is predicted on the basis of the travel duration up to this point in time, of at least of one consumption profile selected for the travel duration, and of the type and duration of the charging cycles of the battery being effected up to this point in time.

4 Claims, 3 Drawing Sheets

U.S. PATENT DOCUMENTS

| | | | |
|---|---|---|---|
| 7,245,107 B2 * | 7/2007 | Moore et al. | 320/112 |
| 7,299,114 B2 * | 11/2007 | Angenendt et al. | 701/21 |
| 7,364,810 B2 * | 4/2008 | Sridhar et al. | 429/17 |
| 7,393,382 B2 * | 7/2008 | Givens | 95/14 |
| 2003/0015864 A1 * | 1/2003 | Midorikawa et al. | 280/807 |
| 2003/0057618 A1 * | 3/2003 | Tanner | 267/136 |
| 2004/0108697 A1 * | 6/2004 | Midorikawa et al. | 280/735 |
| 2004/0159739 A1 * | 8/2004 | Jakubowski, Jr. | 244/10 |
| 2004/0222768 A1 * | 11/2004 | Moore et al. | 320/128 |
| 2005/0146128 A1 * | 7/2005 | Midorikawa et al. | 280/807 |
| 2006/0005758 A1 * | 1/2006 | Potter et al. | 114/312 |
| 2008/0027639 A1 * | 1/2008 | Tryon | 701/209 |

* cited by examiner

METHOD FOR PLANNING THE JOURNEY OF A SUBMARINE

CROSS REFERENCE TO RELATED APPLICATIONS

This application claims the benefit of priority under 35 U.S.C. §119 of German Application 10 2004 024 972.5 filed May 21, 2004, the entire contents of which are incorporated herein by reference.

FIELD OF THE INVENTION

The invention relates to a method for planning the journey of a submarine.

BACKGROUND OF THE INVENTION

Conventionally powered submarines comprise generators which are powered by combustion motors (engines), and these generators produce electrical energy which is stored in the batteries. Furthermore these submarines comprise an electrical drive which, with the help of the electrical energy stored in the batteries, permits the submarine to travel independently of external air. Since however the battery capacity is limited, it is necessary again and again to charge the batteries in the meantime, for which the submarine must surface, or must aspirate the external air required for operation of the combustion motor via a snorkel. The submarine may be located much more easily in these traveling conditions than with a submerged journey independent of external air. For this reason, during a mission one attempts to keep these traveling conditions as short as possible or to conduct these in journey sections in which the danger of a discovery is lower on account of external factors, for example a geographic situation.

Furthermore the behavior of the lead accumulators which are usually applied in submarines is also problematic with regard to the planning of the charging cycles of the battery. Two charging stages result on charging these accumulators or batteries. In the first charging stage one attempts, with an as high as possible current, i.e. as a rule with the maximum available charging power, to charge the battery as quickly as possible. With lead batteries however, on reaching a certain voltage dependent on the acid temperature, an undesirable production of $H_2$ gas occurs, which is not permissible in the submarine. This voltage may not be exceeded in order to avoid this gas production. For this reason, the charging current and thus the charging power must be reduced with an increasing capacity level in the second charging stage. With this, the charging current would theoretically tend to zero in an asymptotic manner only after an infinitely long time, wherein theoretically 100% of the battery capacity is achieved. In practice this second charging stage is therefore terminated after a finitely small charging current. This second charging stage leads to an extension of the charging time, and thus of the time during which the submarine must travel surfaced or by snorkel (worsened indiscretion rate IR=indiscrete charging time fraction in relation to the discharging/charging cycle time).

Since the acid density is dependent on the capacity level and the battery voltage is proportional to the acid density, the time of the mentioned second charging stage is approximately the same, independently of the extent of the previous discharging. This means that even with small discharging quantities one always requires an unfavorable, long second charging stage, by which means the time in which the submarine is not completely protected (indiscretion rate IR), is extended even more.

For this reason, the second charging stage may often not be implemented to the end in practical operation, i.e. the charging must be terminated with a charging of the battery which is not complete. By way of this however the behavior of the battery changes with each renewed discharging of the battery. The specific demand is increased so that the maximal capacity may no longer be fully exhausted. Furthermore with the charging which follows, the gas production sets in very much earlier, i.e. at a low capacity level, so that the unfavorable second charging stage is extended even further. This worsens with each incomplete discharging/charging cycle. Furthermore with a battery capacity which is not sufficient one may no longer travel with the submarine at maximal speed, as a rule, when the battery capacity level with long-term discharging has been discharged below about 45%. This condition should never occur for tactical reasons.

On account of the previously outlined problematic charging behavior of the batteries of a submarine, and due to the operation of a conventional submarine dependent on the external air which is to be avoided where possible, the journey planning and advance planning of the required charging and discharging cycles of the battery is extremely complex and difficult.

SUMMARY OF THE INVENTION

It is therefore the object of the invention to provide a method for planning the journey of a submarine, which permits the advance planning of the charging and discharging cycles and in particular permits a shortening of the unfavorable charging conditions.

According to the invention, a method and system are provided for planning the journey of a submarine, The method and system comprise at least one electric drive with a battery for energy supply, and a charging means for the battery. For a selected future point in time, the remaining available energy reserve of the battery is predicted on the basis of the travel duration up to this point in time, with at least one consumption profile selected for the travel duration and the type and duration of the charging cycles of the battery being effected up to this point in time.

The method according to the invention is designed to be carried out in a computer system. For this, the method is preferably implemented in a computer program, on whose execution the method may take its course on a suitable computation installation, preferably on a standard PC. Such a program with the method according to the invention may at the same time be integrated for example in computer systems, which are present in the submarine, for example navigation computers, and control computers for the operation of the submarine. The method according to the invention and in particular computer systems which implement this method may however also be applied outside the submarine, for example in an operations center in order there to plan the journeys of submarines or also to be able to predict possible movements of enemy submarines. The program may further be used for simulation purposes for training on land.

The method for journey or cruise planning according to the invention is designed for submarines which comprise at least one electrical drive with a battery for the energy supply, and a charging means for the battery. Such a charging means, with conventional submarines, is for example a diesel motor which drives a generator for the production of electricity. Additionally, in such a submarine one may also provide an energy supply independent of external air (air independent propulsion system, AIP system for short), in particular a fuel cell installation, which supplies the electrical drive as well as the other electrical consumers of the submarine with energy and, as the case may be, may also be used in order to charge the batteries. Further possible drive systems which are independent of external air are e.g. circulation diesels, Stirling drives or MESMA drives.

The method according to the invention proceeds in a manner such that firstly a future point in time is selected for which a remaining available energy reserve, i.e. the remaining residual capacity of the battery up to a preselected discharging limit is predicted. According to the invention, the prediction of the remaining energy reserve at the future point in time is effected on the basis of the cruise or travel duration up to this point in time, wherein at least one certain consumption profile is selected for the cruise or travel duration. Such a consumption profile specifies the energy consumption of the submarine in a certain travel or cruising condition. At the same time firstly the energy consumption of the drive and also the energy consumption of all remaining consumers (Hotel Load) is acquired. The energy consumption differs considerably with various travel conditions of the submarine, in particular with different speeds. At the same time external factors such as the flow or ocean/sea currents, submerged depth, distance to the ocean/sea bed or ground, respectively, as well as the installations and systems on the submarine which are required in a certain travel condition and their energy consumption are taken into account. Such consumption profiles for various travel conditions of the submarine are stored in a memory unit of the computer system or are computed in a current manner on the basis of certain initial values, in particular on the basis of the energy consumption of individual consumers. The shipyard may specify the consumption profiles, but they may also be determined in reference journeys of the submarine for the different travel conditions, and stored. From the individual consumption profiles, by way of interpolation or extrapolation, one may also determine consumption profiles for other travel conditions for which no consumption profile has been stored in advance.

Apart from the travel duration and the consumption values of electrical energy resulting from the selected consumption profile, according to the invention, the type and duration of the charging cycles of the battery effected up to this point in time are also taken into account for determining the remaining energy reserve. I.e. one takes into account whether, how often and in which charging stage the battery has been charged up to the selected future point in time. In this manner with lead accumulators for example, one may take into account changes in the battery capacity and of the battery behavior, which result due to the fact that in the preceding charging cycles, the second charging stage was not implemented at all or not right up to the end.

This more exact, calculated evaluation of the remaining residual energy in the battery up to a predefined or predefinable discharging limit for any future point in time permits a more accurate mission or journey planning, since the required charging cycles may be predicted in an accurate manner and may be kept as short as possible by way of this.

Preferably on the basis of a planned travel duration with at least one selected consumption profile and proceeding from an initial charged state with a maximal battery capacity, i.e. with a maximum battery capacity, a first discharging cycle of the battery is simulated or computed and the remaining energy reserve of the battery up to a defined or predefined discharging limit at the end of this first discharging cycle is predicted. The initial charging condition with a maximum battery capacity is always achieved after a complete charging cycle in which, with lead accumulators, the above-described second charging stage is implemented with a reduced charging current to the end, wherein, as described above, in practice the charging procedure is terminated at an finitely small charging current. Proceeding from this full battery capacity, then on the basis of a selected consumption profile or several selected consumption profiles, if the traveling condition changes during the planned travel duration, the discharging procedure of the battery may be simulated so that the remaining energy reserve of the battery may be predicted at the desired point in time.

Then in a next step, on the basis of this remaining energy reserve, one may determine whether the battery needs to be charged again and how much time is required for the charging procedure. At the same time one may in particular evaluate how much time in the second charging stage with a reduced charging current is required in order to fully charge the battery. Alternatively, in the second step, on the basis of a certain consumption profile, one may evaluate how far one may still travel in a manner independent on external air with the remaining residual capacity up to a certain discharging limit. With the simulation of a discharging cycle of the battery, apart from the consumption values which are predefined by way of the consumption profile, one may take other influencing variables into account, which, if they are typical for certain travel conditions, may likewise be put down or stored in the consumption profile. Such influencing variables may in particular be influencing variables which influence the battery behavior and in particular the battery capacity, such as for example the current acid temperature, or also variables which are specified by the type of submarine, such as battery type, battery characteristics, battery size, cell number, part batteries etc.

It is further preferable, proceeding from the predicted remaining energy reserve of the battery at the end of the discharging cycle, to simulate or compute a charging cycle taking into account a selected charging time and the power of the charging means which is available, and to predict the available energy reserve of the battery at the end of this charging cycle. For simulating the charging cycle, one takes into account influencing variables which are predefined by the submarine type, i.e. battery type, battery size, cell number, maximal available charging power, etc. For determining the available charging power, the traveling condition during the charging, i.e. in particular the travel speed is also taken into account. Thus the required drive power as well as the required Hotel Load for operating the means and the systems of the submarine is subtracted from the maximal available generator power, and in this manner the maximum charging power available in the respective traveling condition is determined. Furthermore, preferably based on the number, type and duration of the preceding charging cycles it is computed how long one needs to maximally charge in the favorable first charging stage and how long in the less favorable second charging stage. For the tactical operation of the submarine, in a practical manner firstly the charging time available is predefined and then on the basis of this one simulates up to which capacity the battery may be charged in this time with the help of the available charging power. Alternatively the system may however also predict the charging time which is required in order with a given initial condition of the battery to again achieve the full battery capacity with the available charging power. Then at the same time one particularly takes into account how long the second charging stage would last, proceeding from the type and duration of the preceding charging cycles.

Particularly preferably, proceeding from the remaining available energy reserve of the battery at the end of the charging or discharging cycle, and on the basis of a further planned travel duration with at least one selected consumption profile, a further discharging cycle of the battery is computed, and the remaining energy reserve of the battery is predicted at the end of this further discharging cycle. This means that the previously described simulations of the charging and discharging cycles according to the method according to the invention may be linked together in any manner in order to plan in advance the complete journey of the submarine or a journey section of the submarine. At the same time for each charging or discharging cycle to be computed, one takes into account the initial condition of the battery existing at the beginning of this cycle in dependence on the preceding charging and discharging cycles. i.e. changes of the battery capacity or the battery behavior by way of previous charging cycles, in particular by way of the fact that a second charging stage is not implemented to the end, are taken into account for the next computation steps, so that at every point in time of the journey the current power capacity of the submarine, in particular the remaining residual travel time and the time which one may travel with the maximal speed, may be predicted or simulated.

According to a special embodiment of the method according to the invention, with the prediction of the available energy reserve of the battery at a selected point in time, the electrical power which may be produced by an energy supply which is independent of the external air (AIP-system), e.g. a fuel cell installation, as well as the fuel and reactand or reactant reserves for such an installation are taken into account. That is to say that with the simulation or prediction of the individual journey sections, the complete electrical power of the submarine which may be available, consisting of the electrical energy stored in the batteries as well as the fuel reserves for the AIP system, e.g. reactand reserves for the fuel cell installation, and of the electrical energy which may be produced therefrom, is taken into account. Furthermore individual journey sections, i.e. charging and discharging cycles of the submarine may be simulated and computed such that a certain portion of the electrical power which is required for the electrical drive and/or the remaining units (Hotel Load) is made available by the AIP system, e.g. of a fuel cell installation. In order to take into account the total energy reserve of the submarine, one may also take into account the quantity of the available conventional, i.e. diesel fuel, wherein usually such a fuel reserve is adequately large so that this represents no problem with the planning of the journey.

Particularly preferably, the remaining fuel reserves for an energy supply system independent of the external air, for example the reactand reserves for a fuel cell installation, are also predicted at a selected point in time. This is effected in that, as previously described, with the simulated charging and discharging cycles, i.e. with the individual journey sections of the submarine, one also takes into account the consumption of the fuel or of the reactands for a certain portion of electrical power which is made available by the AIP system. Thus at every point in time, the power capacity of the submarine may be predicted on the basis of the total electrical power which may be made available, i.e. of the batteries and AIP system.

It is furthermore preferable, for the selected point in time, on the basis of the computed remaining energy reserve of the battery as well as, where appropriate, the remaining fuel or reactand reserves of the AIP system, to determine a remaining residual travel time at a selected consumption profile. Inasmuch as the residual energy reserve, i.e. the energy reserve of the batteries as well as the reserves of fuel or reactands is predicted, then with a known consumption or electrical power consumption according to a selected consumption profile, one may compute the remaining residual travel time. Apart from the consumption profile, one may also take into account current data on the battery condition, in particular the acid temperature, etc.

Preferably, on the basis of the previously described methods cycles, a travel or cruise profile of the submarine is predicted in a manner such that individual journey sections with selected consumption profiles and an associated charging and discharging power of the battery are simulated by calculation and are compiled into a total travel profile, wherein each journey section in each case is simulated on the basis of the remaining energy reserves at the end of the preceding journey section (leg) and on the basis of the type and duration of the previously effected charging and discharging cycles of the battery. i.e. the complete travel profile is built up in steps, wherein the remaining energy reserve and battery condition at the end of the journey section or leg is predicted for each journey section, and the next journey section is simulated on the basis of this. Thereby one particularly takes into account whether, in the advance planning, the battery is previously completely charged or only partly, without the complete second charging stage. The individual journey sections thereby may represent charging cycles, i.e. the submarine travels surfaced or at snorkeling depth, or discharging cycles in which the submarine travels submerged and independently of external air. With the prediction of the complete travel profile, one may furthermore set further initial values. In particular one may previously input into the computer carrying out the program, in which journey sections, for technical reasons one must at all events travel in a submerged manner, and in which journey sections one may envisage charging cycles. The individual journey sections having the charging and discharging cycles may then be adapted such that the lie in the predefined journey sections.

Usefully constraints on the journey and in particular possible points in time and the respective possible duration of the charging and discharging cycles of the battery may be inputted via an electronic marine chart, and from this may be adopted as initial conditions for the computation of the travel profile, into a computation unit. In the electronic marine chart one may therefore mark the journey sections in which one may travel submerged or surfaced or at snorkeling depth. Furthermore, for the computation, one may also input further constraints which influence the energy consumption, such as water depth, sea currents and for example also the submerged depth, or adopt these into the computation unit. For this, the computer of the marine chart and the computation unit are linked to one another for creating the travel profile, or ideally operate on the same computer system. One may thus create an integrated system.

It is further preferred for the created travel profile to be displayed in an electronic marine chart preferably with the relevant values characterizing the respective travel condition, in particular with the required charging cycles of the battery. This may be effected for example by way of colored marking of the travel route depending on the travel condition, in particular for characterizing the charging cycles. Furthermore, important parameters such as for example the travel speed may be displayed on the electronic marine chart or on a separate display in a graphic or alphanumeric manner. The results of the electronic travel planning according to the previously described method are outputted in various forms on a display means, for example on a monitor (screen) with all relevant data. For this, one may for example output different graphs or curves which display the course of the power capacity, i.e. in particular the battery capacity, over the simulated travel duration.

The travel profile furthermore is preferably created in a manner such that at no point in time does the battery capacity fall below a preselectable limit capacity. The settable limit capacity for example is the residual capacity which should not be fallen short of in order to maintain the life duration of the battery or in order to achieve a longer battery lifespan. This for example may be a residual capacity of 20%. Furthermore, such as limit capacity may be that residual capacity which is required so that the submarine may achieve its maximal speed with the electric drive over a predefined time magnitude. For this, one may additionally take into account the electrical power which may be produced by an AIP system, e.g. a fuel cell installation. Thus the travel profile computer may determine necessary charging cycles which are applied such that an adequate battery capacity is always given and the remaining energy reserve never falls below the predefined limit capacity.

It is furthermore preferable to continuously acquire parameters of the current operating conditions, in particular the battery capacity, the battery temperature, the charging and discharging power of the battery, the charging and discharging times, the power consumption of all units as well as the generator power of the submarine, and these parameters serve as initial (starting) data for the evaluation by calculation of the remaining energy reserve of the battery at the selected future point in time. Furthermore one may also continuously acquire actual operating parameters of an AIP system, in particular the delivered electrical power and the remaining fuel or reactand supplies, and these may be incorporated into the computation. Furthermore the data may be stored for documentation or as a basis for later computations. It is thus possible to create an even more accurate prediction of the remaining energy reserve on the basis of these data.

Furthermore the acquired current operating conditions may be used in order to correct computations of the energy reserve which have already been effected, or a previously created travel profile. This for example may be necessary if the actual travel conditions deviate from the consumption profile on which the computation was based, if for example the travel speed, the course or the submerged depth must be changed on account of a tactical maneuver. The continuously acquired operating parameters may then be used to correct the travel profile on the basis of the changed values, automatically or activated in a manual manner, so that the remaining energy reserves for future points in time may be determined as accurately as possible.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The invention is described hereinafter by way of example and by way of the attached diagrams. In the drawings.

DESCRIPTION OF THE PREFERRED EMBODIMENTS

Figure 1:
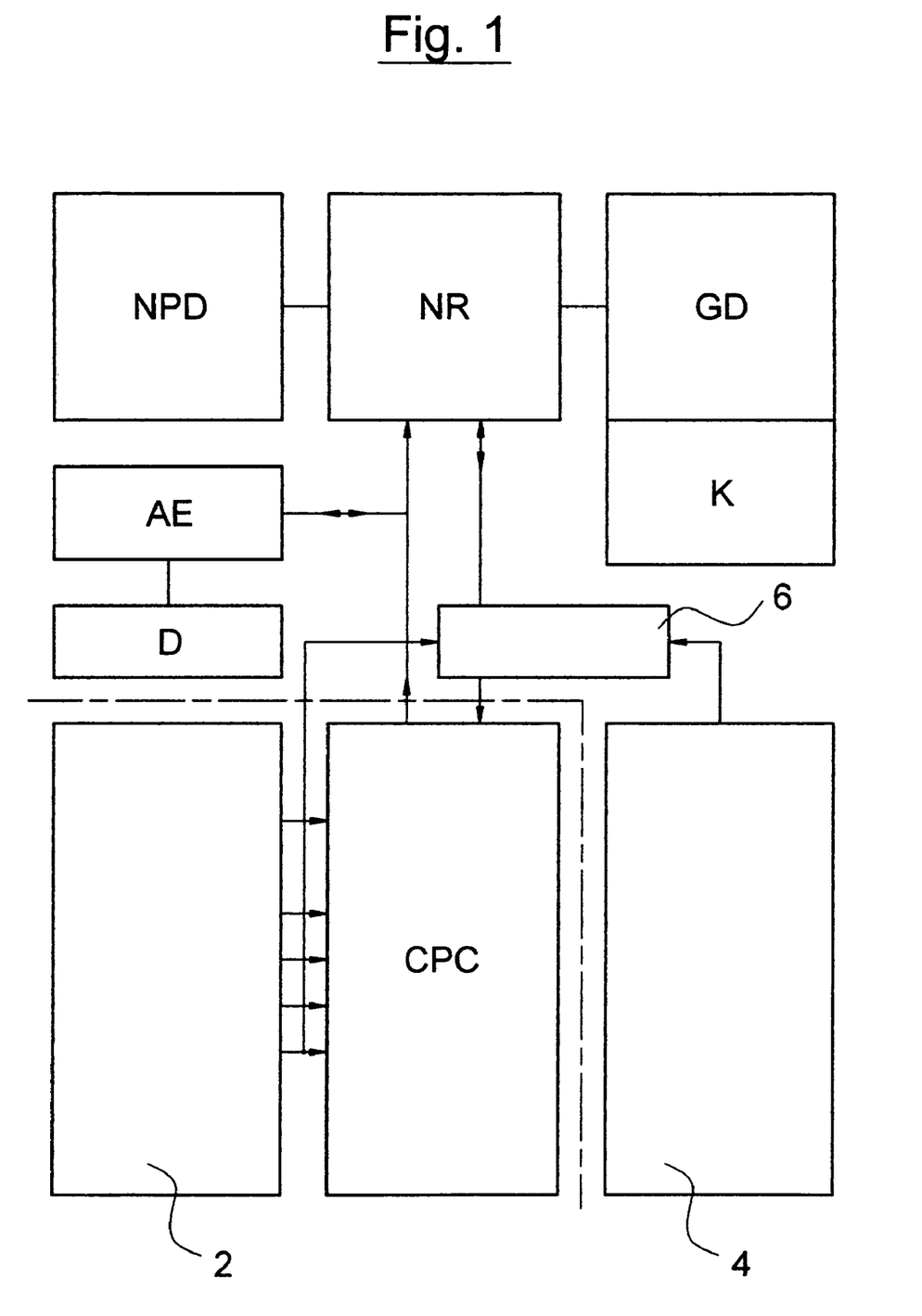
FIG. 1 is a schematic view showing the construction of a travel profile computer for carrying out the method according to the invention.

Referring to the drawings in particular, FIG. 1 schematically shows the design of a system in which a cruise or travel profile computer is integrated in order to carry out the method according to the invention for planning the journey of a submarine. The explained example relates to a travel profile computer which is integrated into a submarine, and here operates together with an existing navigation system. At the same time the navigation system forms the interface for the input and output of data. The navigation system comprises a navigation computer NR which is connected to a navigation planning display NPD which represents the planned and current travel route in an electronic marine chart. The navigation computer is furthermore connected to a graphic display GD which serves for representing current travel data as well as the predicted travel profiles and in particular the predicted course of the capacity of the batteries in graphic or numerical form. The installation furthermore comprises an input means K, for example in the form of a keyboard. The navigation computer NR furthermore communicates with an output means AE which is provided in order to output files or documents D. The output means may for example be a disk-drive or CD-drive or a printer. Inasmuch as it is the case of a data carrier (memory) drive, the output means may also be used to transmit data or read the data into the navigation computer. The navigation computer NR communicates with the cruise or travel profile computer CPC via interfaces. The navigation computer NR and the travel profile computer CPC may be designed as separate computation units or computer systems which communicate via suitable interfaces. Alternatively the travel profile computer CPC and the navigation computer NR may be provided as software modules on the same computer system.

The travel profile computer CPC for outputting or for the display of the results, transmits its computation results directly to the navigation computer NR which either represents the results on the navigation planning display NPD, i.e. on the electronic marine chart, or outputs these graphically or numerically on the separate graphic display. In a reverse manner, the navigation computer NR also transfers input data to the travel profile computer CPC, in particular data on the planned travel route, said data being inputted via the navigation planning display NPD or the input means K. Furthermore a data memory 2 is provided in which initial data or basic data and in particular certain consumption profiles are stored. Such data may for example be the propeller rotational speed at various travel conditions, for example such as snorkeling travel, silent or crawling travel, etc., data on the battery type, diesel drive, AIP system (e.g. fuel cell installation) and other constants and factors which the travel profile computer CPC requires for the advance planning of the travel profile. This data is either transmitted into the travel profile computer CPC as initial data for the one-off computation, or as online data 6 to the travel profile computer CPC as well as the navigation computer NR in a continuous manner for updating the created travel profile. Furthermore, data acquisition means 4 are provided which acquire current operating data of the submarine such as for example speed, propeller rotational speed, battery voltage and current, battery capacity or charging condition, acid temperature, motor current, generator current, current power or present current of the remaining consumers (Hotel Load), fuel reserve and reserve of reactants for a fuel cell installation. This data is made available to the navigation computer NR and the travel profile computer CPC as online data 6.

Figure 2:
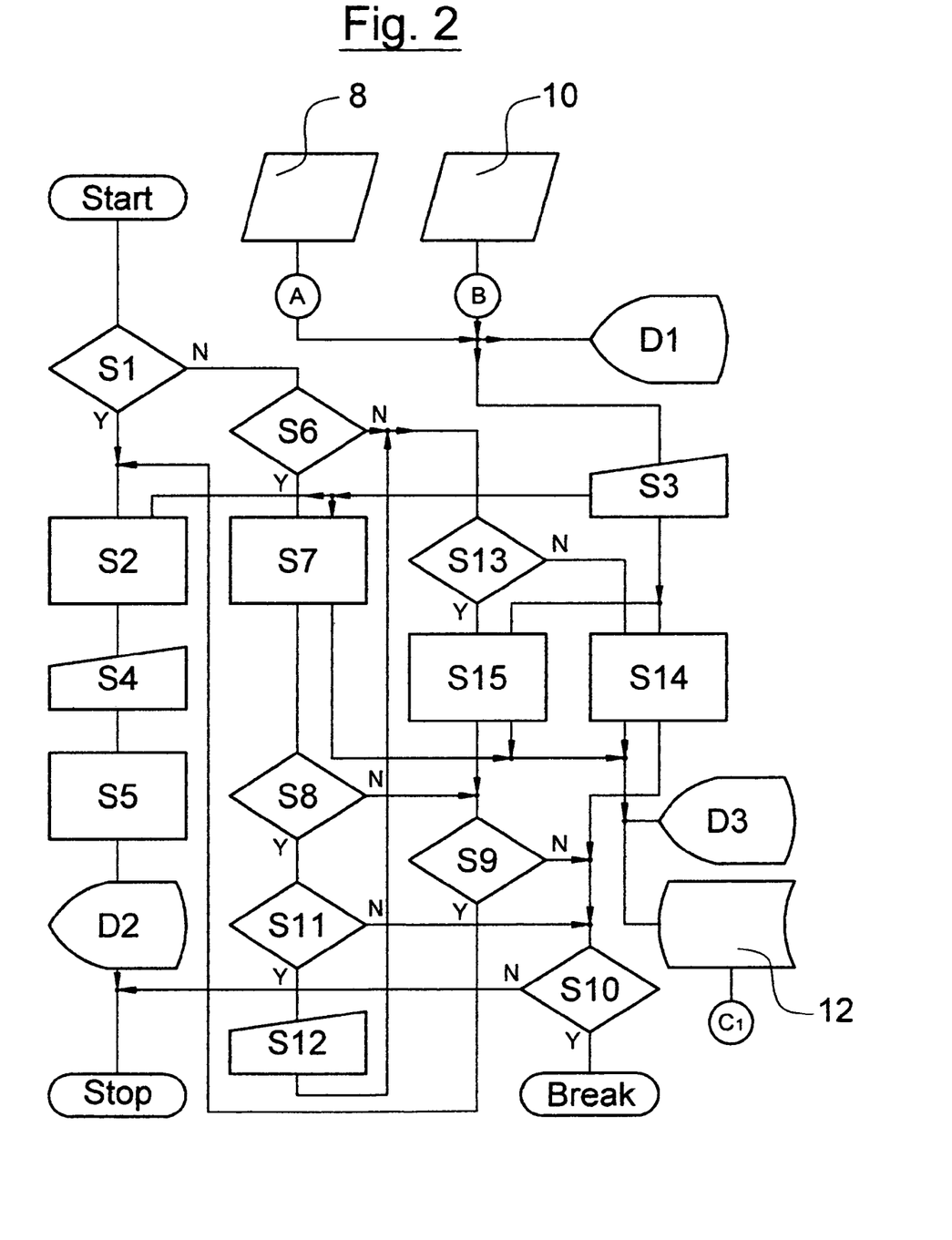
FIG. 2 is a schematic view showing the procedure of the method for predicting the remaining energy reserve at a certain point in time.

FIG. 2 shows the procedure of the method for predicting or for the prognosis of the remaining power capability or of the residual travel time of the submarine. After the start of the method, in step S1 it is decided whether, proceeding from the current available energy reserves, the residual travel time or the residual power capacity of the submarine is to be determined. In the case that this is to be determined, a corresponding computation takes place in step S2, wherein the current data 8 and/or the stored data 10 from a data memory 2 enter in this computation. Current data may for example be the data on the battery capacity still remaining, the battery temperature, remaining fuel or reactand reserves of an AIP system etc. The stored data in particular contain consumption profiles which specify consumption values for various travel conditions which in turn specify the energy consumption of all systems and of the drive of the submarine in the respective travel condition, for example crawling travel, full load, etc. The data 8 and 10 in step D1 may be displayed on a display device, in particular on the previously described graphic display GD, and may then be manually or automatically selected in step S3. Here, in particular a consumption profile matching the planned travel situation may be selected or its computation or interpolation may be initiated. The data selected in step S3 is taken into account with the computation in step S2. In step S4 one may then select the display manner of the evaluated power capability or the predicted power capability of the submarine, for example whether the data is to be outputted numerically or graphically on the graphic display GD or also directly on the electronic marine chart of the navigation planning display NPD. Then a suitable data preparation takes place in step S5, and in step D2 the selected issuing of the data. With this, the basic stage of the prediction of the remaining power capability of the submarine with regard to its energy reserve is completed.

With the data to be selected in step S3 and to be taken into account in the computation in step S2, in particular all procedures since the beginning of the travel period are taken into account, in particular previous charging and discharging procedures of the battery which have an influence on the current power capability or capacity of the battery, i.e. e.g. whether a second charging stage has been implemented to the end or not. Furthermore basic values may be set by the user, for example that the battery capacity should not fall below 50% in order to always retain the possibility of the submarine traveling at maximum speed in a manner independent of external air. Furthermore one may select how much percent of the required electrical power is to be made available by an AIP system inasmuch as this is present. Additionally the system may preferably also be set such that new computations are effected automatically when the current data 8 which is relevant to the respective computation changes. Thus the predicted route points and data as well as in each case the actual location and the actual parameters may be displayed on the navigation planning display NPD so that a constant monitoring of the journey is possible.

The computation of the required snorkeling time or the time in which one must travel in a surfaced manner in order to recharge the batteries again is additionally possible with the method. Furthermore it is possible to monitor or to plan a current discharging procedure. If for this the decision "no" is made in step Sl, in step S6 it is decided whether a discharging or a charging procedure is to be computed. If so, a discharging procedure is simulated or computed in step S7, wherein one falls back on the data selected in step S3, in particular, on a selected consumption profile and the current battery characteristics or capacity which in particular may be dependent on previous charging and discharging cycles. The result of the computation in step S7 is then for example issued (outputted) on the graphic display GD in step S7. One determines whether the preselected end capacity of the battery is reached in the subsequent step S8. If the end capacity is not yet reached, in step S9 it is checked or inquired whether accordingly the remaining residual travel time or residual capacity is to be computed. If so, the previously described method begins with step S2.

If not, in step S110 it is checked as to whether a renewed computation beginning with step S1 is desired. The method is ended if the inquiry or checking in step S10 results in the value "no".

If the inquiry in step S8 is answered with "yes", i.e. if the end capacity of the battery is reached, then the inquiry S11 as to whether in the next step a charging procedure is to be simulated or computed follows. The described step S10 follows if the inquiry is answered with "no". If the inquiry is answered with "yes", then a computation of the charging procedure follows, wherein firstly in step S12 a speed value for the surfaced or snorkeling travel which is required for charging the batteries with the help of the combustion motors is inputted. Subsequently step S13 follows to which the method also arrives if the inquiry in step S6 is answered with "no", i.e. for the case that straight away a charging procedure is to be computed and not a discharging procedure.

In step S13 it is inquired whether there is a limitation for the charging procedure or not. If not, then step S14 follows in which a complete charging procedure is simulated or computed whilst taking into account the boundary parameters selected in step S3. At the same time the selected or required current data 8 and stored data 10 is taken into account, which in particular take into account the current battery capacity, battery temperature, battery type, available. charging power and also the type of preceding charging procedures. Thus the current battery condition may be taken into account. This for example is important with lead accumulators in order to determine how long one must charge in the first charging stage in which one charges with the maximum charging current, and how long one needs to charge in the second charging stage with a reduced charging current, in order restore the full capacity of the battery again. The maximum charging power which is available in particular depends on the consumption of the remaining electrical consumers and of the drive, i.e. on the selected travel speed as well as external conditions, sea/ocean currents, vicinity to the coast or to the sea/ocean bed etc, wherein these values may be suitably selected or inputted in step S3. In this manner, a complete charging cycle up to reaching the full battery capacity is simulated in step S14. The result is subsequently displayed in step D3, for example on the graphic display GD or the navigation planning display NPD. Step S10 which has already been described then follows step S14.

Step S15 follows if the inquiry in step 13 is answered with "yes". A charging limitation which is present on answering the inquiry in S13 with "yes", may for example be given by way of the fact that the submarine may only travel surfaced or at snorkeling depth for a limited time, since otherwise the danger of being located would be too great. A part charging procedure is simulated in step S15, wherein here too the data selected or made available in step S3, such as current battery characteristic and capacity, in particular the type of previous charging, is taken into account. In the case of lead accumulators, in step S15 for example one computes how long one may charge with the maximal charging current in the first charging stage and which share of the second charging stage may be implemented before the charging procedure is terminated due to limitations. As also with step S14, the condition of the battery which may be achieved by the computed charging, i.e. the achievable battery capacity or the energy reserve which is available at the end of the charging procedure, is displayed in step D3.

All computation or simulation results which are displayed in step D3 in a graphic or numerical manner are furthermore deposited into a data memory 12. The predicted energy reserve of the battery or the planned condition of the batteries is particularly stored here.

Figure 3:
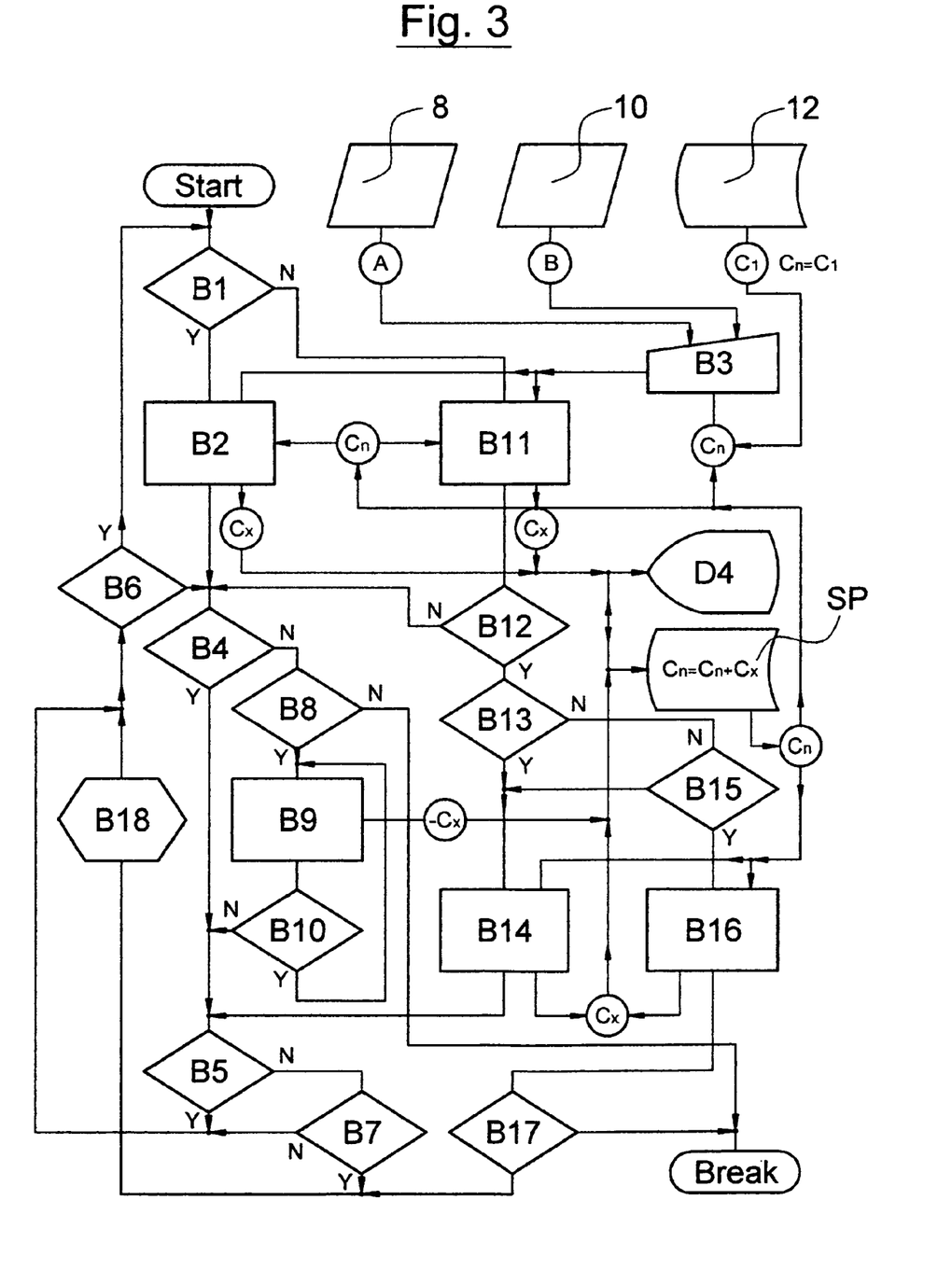
FIG. 3 is a schematic view showing the procedure of the method for predicting a travel profile, wherein in the flow diagrams according to FIG. 2 and FIG. 3, Y=yes and N=no.

By way of FIG. 3 it is now explained how, proceeding from the method explained by way of FIG. 2, one may create a complete travel profile, according to the invention. The complete travel profile is composed of a series of individual charging and discharging cycles. These are defined by different travel conditions of the submarine in which the submarine either travels submerged independently of external air, or in a surfaced manner or with snorkeling travel, dependent on external air. In the travel conditions in which the submarine travels independently of external air, the batteries are usually discharged, inasmuch as, exclusively, an available AIP system such as e.g. a fuel cell installation for producing electrical energy is not applied. In the travel conditions in which the submarine travels surfaced or in a snorkeling manner, one may operate a combustion motor in order to charge the batteries via a generator.

For creating a complete travel profile, according to the method procedure in FIG. 3, firstly a decision is made in step B1 as to whether this charging or discharging cycle is to be computed or simulated. In step B2 the computation of a discharging cycle follows, inasmuch as the inquiry is answered with "yes". This corresponds essentially to the manner of proceeding explained by way of FIG. 2. Current data 8, stored data 10 and furthermore the results of a simulated preceding charging and discharging cycle stored in the data memory 12 are taken into account for the computation in step B2. The data stored in the data memory 12 corresponds to the result data stored in data memory 12 at the end of the method procedure according to FIG. 2. The current data 8 as well as the stored data 10 are offered for selection by an operator in step B3, wherein this corresponds to the step S3 explained by way of FIG. 2. The result of the selection is taken into account in step B2 for the simulation of the discharging procedure. This in particular is a selected consumption profile. Furthermore this is the predicted capacity read out from the data memory or the predicted energy reserve of the battery which as a variable Cn is led to step B3 and the computation step B2 as a basis. This means that in step B3 one may manually select whether one begins the computation on the basis of a previously computed battery capacity according to a preceding charging or discharging cycle. The consideration of this data may also be effected in an automatic manner, which is desirable with the creation of complex travel profiles. In step B4 which follows step B2, it is tested as to whether one should proceed. If the answer is confirmed with "yes" then step B5 follows in which it is decided as to whether a further or new charging or discharging cycle is to be computed. In the case that this decision is answered with "yes", then step B6 follows in which it is checked as to whether certain limit values, for example preselected limit values for the residual capacity to the battery, are to be adhered to. If this inquiry is answered with "yes", then the computation of the new charging or discharging cycle follows with step B1.

The result of the computation step B2 ($C_x$), i.e. in particular the resulting residual capacity of the battery is furthermore displayed for example in the graphic display in step D4. Furthermore in step SP the stored initial value $C_n$ is updated by addition of the result $C_x$ of the preceding computation, and stored as an initial variable for the next computation step. In particular the initial capacity of the battery is set to the end value of the computed preceding charging or discharging cycle for the next charging or discharging cycle to be computed. If in step B5 it is ascertained than no new period or no new charging or discharging cycle is to be computed, then it is decided in step B7 whether the creation of the travel profile is ended or not. If so, the computation of a new travel profile is prepared in step B18 which again begins with the step B1. If it is decided that the computation of the travel profile is not ended, then step B6 and subsequently the computation of a further charging or discharging cycles beginning with step B1 follows.

If it is decided in step B4 not to continue, then step B8 follows in which it is decided whether the last computed period is to be deleted or not. If so, then step B9 follows in which the last computed data is deleted and an output variable $-C_x$ is outputted, which is taken into account in step SP in order again to correspondingly set back the value $C_n$ changed by way of the addition of the initial variable $C_x$. In step B10 an inquiry then follows as to whether cycles of the travel provide which lie further back are to be deleted. If so step B9 follows again and if not, then the already described step B5 follows.

The method is ended if in step B8 it is ascertained that the values are to be deleted.

If in step B1 it is ascertained that no discharging procedure is to be computed, i.e. the inquiry is answered with "no", then step B11 follows in which a charging cycle is simulated or computed. The computation step B11 again as input variables obtains the stored and current data 8 and 10 selected in step B3, and furthermore the capacity value or the values $C_n$ characterizing the battery condition which result at the end of the previously computed cycle. The result $C_x$ is again outputted at the end of the simulated charging cycle in step D4 and in step SP is set as a new initial variable for a subsequent cycle. The computation of the charging cycle in step B11 is effected as is explained by way of the steps S14 and S15 by way of FIG. 2. In step B12 an inquiry follows as to whether computed cycles are to be repeated. If not the already described step B4 follows. If so, then step B13 follows in which it is decided as to whether an intermediate charging or discharging cycle is to be repeated. If so then step B14 follows in which the multiplication of an already computed intermediate cycle is effected. The initial value $C_x$ of the step B14 is again led to step SP in order here, by way of addition of the value $C_x$, to set the value $C_n$ as an initial value for the next cycle to be computed. The already described step B5 then follows step B14. If in step B13 it is decided than no intermediate cycle is to be multiplied, step B15 then follows, in which it is decided whether the computation of the complete travel profile is completed. If so the multiplication of the complete travel profile or of a part profile, consisting of individual charging and discharging cycles follows in step B16. The initial value $C_x$, as described, is processed further in step SP as an initial variable for the next computations. Step B17 then follows in which it is decided whether the next travel profile it to be set up, whereupon the already described step B18 follows. If no next travel profile is to be created, the method is ended in step B17. The already described step B14 follows if in step B15 it is decided that the complete travel profile is not yet completed.

Individual charging and discharging cycles may be rowed or joined to one another in the described manner, in order in this manner to plan a travel profile of the total journey of the submarine or of a part section of the journey of the submarine in advance. For this, as initial data, preferably firstly one may mark on an electronic marine chart particularly dangerous sections in which one must at all events travel submerged, i.e. independent of external air, so that a sufficient battery capacity must be available in these journey sections. One may then mark on the electronic marine chart the regions in which one may travel in a snorkeling or surfaced manner for a longer or shorter time. Subsequently for the travel route which is divided up in is manner, then for the individual journey sections in which one travels dependently or independently of the external air, one may then simulate and predict the individual charging and discharging cycles so that the journey may be planned such that an adequate battery capacity is available for each travel situation, in order to be able to carry out the desired tactical maneuver.

Furthermore, as described by way of FIG. 2, on account of the computer system or method according to the invention, there exists the possibility of determining the remaining residual travel duration with the present energy reserve so that the power capacity of the submarine may be predicted also for further points in time.

What is essential with regard to the invention with all computations is the fact that preceding charging cycles, either effected or predicted, are taken into account for computing the charging and discharging cycles which later follow, i.e. in particular whether a second charging stage has been fully implemented, prematurely terminated or not effected at all in a charging cycle. The predicted battery condition which results from this, e.g. a gas production which sets in at an early stage, forms the basis of subsequent computations.

The computation of a total travel profile begins proceeding from a fully charged battery, i.e. with 100% battery capacity up to a predetermined discharging limit, and ends when this fully charged condition of the battery is reached again. Various charging and discharging cycles may lie between these two conditions, in which the battery is not fully charged, i.e. in particular in which the second charging stage is not implemented to the very end. These charging cycles may, as previously described, be predicted and simulated by the method and program according to the invention so that the total journey may be planned in advance accordingly.

The method or the installation is first and foremost designed to be applied directly on a submarine and to be integrated there into a computer system. The method may also alternatively be used in a command center, in order for example to be able here to accordingly plan and coordinate the deployment of a submarine or also the complete fleet of submarines. Furthermore, with the knowledge of certain basic data it is also possible to simulate the journey of possible enemy submarines since with the method according to the invention it is possible to predict in which sections the submarines have to surface in order to charge their batteries. Furthermore the method or a computer program implementing the method or an installation implementing the method may also be used for training, for example of submarine crews in training centers on land.

While a specific embodiment of the invention has been shown and described in detail to illustrate the application of the principles of the invention, it will be understood that the invention may be embodied otherwise without departing from such principles.

| LIST OF REFERENCE NUMERALS | |
| --- | --- |
| NPD | navigation planning display |
| NR | integrated navigation system |
| GD | graphic display |
| K | input means |
| AE | output means |
| D | document |
| CPC | travel profile computer |
| 2 | data memory |
| 4 | data acquisition means |
| 6 | online data |
| 8 | current data |
| 10 | stored data |
| 12 | data memory |

What is claimed is:

1. A method for planning the journey of a battery powered vehicle, the method comprising the steps of:

obtaining battery characteristics for a battery, said battery characteristics including battery capacity indicating an amount of energy that can be stored in the battery, said battery capacity varying depending on how the battery is charged, said battery characteristics including an initial energy reserve of the battery;

receiving a destination for the vehicle;

determining a travel profile for the vehicle to reach the destination, the profile having a plurality of discharging cycles which supply energy to operate the vehicle as the vehicle travels to its destination, the discharging cycles decreasing the energy reserve of the battery, the travel profile having a plurality of charging cycles for increasing the energy reserve of the battery;

determining how much each of the discharging cycles will reduce the energy reserve of the battery;

determining how much each of the charging cycles will increase the energy reserve of the battery, and how each of the charging cycles will affect the battery capacity determining how each change in battery capacity from a previous charging cycle will affect the increasing of the energy reserve of future charging cycles;

predicting a future energy reserve of the battery at the destination of the vehicle based on the plurality of discharging cycles, the plurality of charging cycles and the changes in battery capacity.

2. A method in accordance with claim 1, wherein:

a type and duration of each of the charging cycles is selected from a plurality of different types of types and durations, the type and duration of the charging cycles are used in said determining of the change in the battery capacity.

3. A method in accordance with claim 1, wherein:

the battery capacity is reduced when the charging cycles do not fully charge the battery to its maximum battery capacity;

the battery characteristics include a first charging stage occurring first in the charging cycle, and a second charging stage occurring after the first charging stage in the charging cycle, said second charging stage increasing the energy reserve of the battery slower then said first charging stage;

determining a plurality of the travel profiles for the vehicle to reach the destination, each of the travel profiles having different discharging and charging cycles;

displaying the discharging and charging cycles and the battery capacity for each of the plurality of travel profiles.

4. A method in accordance with claim 3, wherein:

the vehicle is a submarine, the discharging cycles occur when the submarine is submerged, the charging cycles occur when the submarine is surfaced, incomplete charging cycles reduce battery capacity, surface time of the submarine is less desirable than submerged time;

a charging device is provided in said submarine for the charging cycles.

* * * * *